United States Patent [19]  
Bracke et al.

[11] 4,013,739  
[45] Mar. 22, 1977

[54] POSTTREATMENT OF COPOLYMER OF STYRENE AND ACRYLONITRILE

[75] Inventors: William J. I. Bracke, Hamme; Jacqueline Brandli, Brussels, both of Belgium

[73] Assignee: Labofina S.A., Brussels, Belgium

[22] Filed: Jan. 9, 1976

[21] Appl. No.: 647,772

Related U.S. Application Data

[62] Division of Ser. No. 553,610, Feb. 27, 1975.

[30] Foreign Application Priority Data

Oct. 24, 1974 Belgium .............................. 149845

[52] U.S. Cl. .......................... 260/880 R; 526/234; 526/342
[51] Int. Cl.$^2$ .......................................... C08L 9/00
[58] Field of Search ....................... 260/880 R, 881

[56] References Cited

UNITED STATES PATENTS

| | | | |
|---|---|---|---|
| 3,491,071 | 1/1970 | Lanzo | 260/85.5 HC |
| 3,780,006 | 12/1973 | Zweigle | 260/85.5 S |
| 3,855,355 | 12/1974 | Moore | 260/880 R |
| 3,912,794 | 10/1975 | Bracke | 260/880 R |
| 3,917,748 | 11/1975 | Vincent et al. | 260/880 R |

*Primary Examiner*—Harry Wong, Jr.

[57] ABSTRACT

A process for producing a copolymer of styrene and acrylonitrile substantially free of acrylonitrile which comprises copolymerizing styrene and acrylonitrile, and optionally in the presence of an elastomer, and treating the resulting copolymer with an aqueous solution of a sulphur compound selected from the group consisting of alkaline sulfides and alkaline disulfides.

3 Claims, No Drawings

POSTTREATMENT OF COPOLYMER OF STYRENE AND ACRYLONITRILE

This is a division, of application Ser. No. 553,610, filed Feb. 27, 1975.

BACKGROUND OF THE INVENTION

The present invention relates to a process for producing styrene and acrylonitrile based copolymers. More particularly, the present invention relates to a process for producing copolymers of styrene and acrylonitrile (SAN) and copolymers of styrene and acrylonitrile containing an elastomer (ABS).

By comparison with homopolymers of styrene, SAN resins offer many advantages, such as a lower thermal deformation, better aging, high gloss and improved mechanical properties. This improvement in several properties becomes apparent when the acrylonitrile content in SAN resins is as low as 5% of weight. However, SAN resins usually are prepared with an acrylonitrile content varying between 25 and 90% by weight.

By polymerizing vinyl compounds, more particularly a mixture of styrene and acrylonitrile, in the presence of an elastomer, particularly a polybutadiene rubber, ABS compositions are obtained which consist of said rubber and acrylonitrilestyrene copolymers, a part of said copolymers being grafted on the rubber particles. Such ABS resins have good mechanical properties, particularly high-impact resistance, when the rubber is grafted by at least 5% of its own weight of styreneacrylonitrile copolymers, the remainder of these copolymers forming a continuous phase wherein the particles of grafted rubber are dispersed.

For preparing ABS or SAN resins, usual polymerization processes may be used, either mass, suspension or emulsion polymerization. In commercial practice, however, a two-step copolymerization is most often used, such two-step process comprising a mass precopolymerization step followed by a suspension copolymerization step. The resins so obtained are beads which are easily separated from the reaction mixture and may then be washed and dried. However, when using any one of these processes, the ratio of styrene to acrylonitrile in the copolymers is always lower than the ratio of styrene to acrylonitrile in the starting monomers mixture if the acrylonitrile content in said monomer mixture is higher than 25%. Consequently, in such case, residual acrylonitrile remains in the resin when the copolymerization is not completed at 100%. It is not advisable, however, to carry out the copolymerization to the very end with a view of avoding the presence of residual acrylonitrile in the copolymer. The reaction rate is lower and lower when the monomer concentration decreases. Further, by carrying on the copolymerization when the total amount of styrene is already copolymerized results in production of the homopolymer of acrylonitrile and this homopolymer has a detrimental effect on the color of the ABS resins. The presence of residual acrylonitrile (which is very toxic) in the resins is harmful when these resins are handled and worked. Further, acrylonitrile is water soluble and the residual process water contains acrylonitrile which has to be removed. For instance, ABS resins which are manufactured from a mixture of styrene and acrylonitrile with an acrylonitrile content of 29% may contain 1 to 1.5% of residual acrylonitrile and the waste process water may contain about 0.5% of acrylonitrile when the content of residual styrene is 0.5%.

The object of the present invention is to provide a new and improved process for producing ABS and SAN resins which are practically free from residual acrylonitrile.

SUMMARY OF THE INVENTION

The present invention is a process for treating SAN and ABS resins to remove residual acrylonitrile, said process comprising treating SAN and ABS polymers with an aqueous solution of a sulphur compound selected from the group consisting of the sulfides and disulfides of alkaline metals, and mixtures thereof.

Acrylonitrile reacts with these sulfides or disulfides and the reaction products which are non-toxic and which would not have been removed by further washing, have no detrimental effect on the properties of the resins. The treated resin, which is free from residual acrylonitrile, also has some properties which are better than the properties of similar resins which have not been treated by the present process. For instance, an ABS resin which has been washed by a sulfide or a bisulfide of an alkaline metal has a higher tensile strength and a higher softening temperature.

DESCRIPTION OF THE PREFERRED EMBODIMENTS

The sulfide or disulfide treating agent of the present invention does not need to be used in an amount exactly corresponding to the stoechiometric amount based on the residual acrylonitrile. By adding such a sulfide or disulfide, the hydrolysis reaction of the acrylonitrile with formation of 3,3'-oxydipropionitrile is improved. One reaction of the sulfide or disulfide, for instance $Na_2S$, with acrylonitrile is the following:

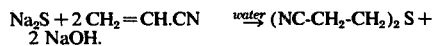

$$Na_2S + 2 CH_2=CH.CN \xrightarrow{water} (NC-CH_2-CH_2)_2 S + 2 NaOH.$$

The basicity of the reaction mixture resulting from the formation of NaOH promotes the hydrolysis of the rest of residual acrylonitrile. Accordingly, the amount of sulfide or disulfide may be as low as 25% of the stoechiometric amount. On the other hand, the sulfide or disulfide may be used in excess of this stoechiometric amount, however, use of such amounts is without improvement in the results. ABS or SAN resins, containing products resulting from the hydrolysis of acrylonitrile, are yellow. Therefore, it is preferable to remove the residual acrylonitrile by reacting it with a sulfide or disulfide and to avoid or at least to minimize the hydrolysis reaction. Consequently. the sulfide or disulfide preferably is used in an amount of between about 50 and 100%, more particularly between 70 and 100% of the stoechiometric amount.

The following examples are presented in order to illustrate the present invention but are not to be considered as limiting thereof.

EXAMPLE 1

The process described in Belgian patent No. 811,750 was used for manufacturing an ABS resin from 23.27 kg of styrene, 9.50 kg of acrylonitrile and 4.92 kg of rubber (stereon 703A, a product of Firestone Tire and Rubber Co.). The process is a two step process comprising a mass copolymerization step followed by a suspension polymerization step. Beads of ABS resin were so obtained. The content of residual acrylonitrile was 1.6% by weight of resin and 0.5% by weight of water (analysis by vapor phase chromatography with ionization by hydrogen flame). Comparative experiments were carried out by adding various compounds known to react with acrylonitrile. These compounds were added at the end of the suspension polymerization, the beads having a temperature of between 100° and 110° C at such time. The beads were not yet hard and the reaction, therefore, was improved. The reaction time between the beads and these compounds was one hour. The results of these comparative experiments were as follows:

| Reactant | Acrylonitrile content (% by weight) after treatment | |
|---|---|---|
| | in the water | in the beads |
| $NaHSO_3$ | 0.08 | 0.28 |
| Diethanolamine | 0.05 | 0.17 |
| NaHS | 0.04 | 0.01 |
| $Na_2S$ | 0.03 | not detectable |

These results clearly show that sodium sulfide and sodium disulfide are more active than the other compounds in reacting with the acrylonitrile.

By using $Na_2S$ in an amount corresponding to about 25% of the stoechiometric amount, the content of residual acrylonitrile in the ABS resin does not decrease below 0.06% and the product prepared by molding this ABS resin is yellow. By using $Na_2S$ in an amount corresponding to 80% of the stoechiometric amount, the content of residual acrylonitrile is decreased to 0.01% and the molded product is not yellow.

EXAMPLE 2

SAN resin was prepared from 2,300 liters of styrene and 865 liters of acrylonitrile. The process used was a mass copolymerization with formation of a mixture having a viscosity of 2,000 centipoises. This mixture has then been polymerized by a suspension process at a temperature of 115° to 135° C. The beads were slowly cooled to a temperature of 110° C. and then washed by an aqueous solution containing 8 kg of $Na_2S$ in 40 liters of water. After this washing, the beads were substantially free from residual acrylonitrile.

What is claimed is:

1. A process for producing a copolymer of styrene and acrylonitrile partially grafted to an elastomeric polymer and substantially free of acrylonitrile which comprises copolymerizing styrene and acrylonitrile in the presence of a butadiene elastomer and treating the resulting copolymer at a temperature of between 100° and 110° C. with an aqueous solution of a sulphur compound selected from the group consisting of alkaline sulfides and alkaline disulfides, the amount of said sulphur compound used being such as to correspond to 25 to 100% of the stoichiometric amount required to react with the residual acrylonitrile in said copolymer.

2. The process of claim 1, wherein the sulphur compound is used in an amount corresponding to about 50 to 100% of the stoichiometric amount required to react with the residual acrylonitrile.

3. The process of claim 1, wherein the sulphur compound is selected from the group consisting of NaHS and $Na_2S$.

* * * * *